US008732675B2

(12) United States Patent
Liang et al.

(10) Patent No.: US 8,732,675 B2
(45) Date of Patent: May 20, 2014

(54) OPERATIONAL ANALYSIS SYSTEM FOR A COMMUNICATION DEVICE

(75) Inventors: Haixiang Liang, Palo Alto, CA (US); Ilya Stomakhin, Cupertino, CA (US); Mark Gonikberg, Los Altos Hills, CA (US); Yury Gonikberg, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1430 days.

(21) Appl. No.: 10/767,604

(22) Filed: Jan. 28, 2004

(65) Prior Publication Data
US 2004/0261061 A1 Dec. 23, 2004

Related U.S. Application Data

(60) Provisional application No. 60/480,666, filed on Jun. 23, 2003.

(51) Int. Cl.
*G06F 9/44* (2006.01)
*G06F 11/00* (2006.01)
*H04B 1/38* (2006.01)
*G06F 11/34* (2006.01)
*H04M 11/06* (2006.01)

(52) U.S. Cl.
CPC ......... *G06F 11/3409* (2013.01); *H04M 11/062* (2013.01)
USPC .............. 717/131; 717/124; 714/37; 375/222

(58) Field of Classification Search
CPC ... G06F 11/34; G06F 11/3409; H04M 11/062
USPC ...................... 717/124–135; 714/37, 47, 47.1; 375/222
See application file for complete search history.

(56) References Cited

U.S. PATENT DOCUMENTS

| 4,385,384 | A | * | 5/1983 | Rosbury et al. | 714/717 |
| 5,353,243 | A | * | 10/1994 | Read et al. | 703/2 |
| 5,745,693 | A | * | 4/1998 | Knight et al. | 709/224 |
| 5,748,878 | A | * | 5/1998 | Rees et al. | 714/38 |
| 5,752,159 | A | * | 5/1998 | Faust et al. | 725/105 |
| 5,805,669 | A | * | 9/1998 | Bingel et al. | 379/28 |
| 6,151,567 | A | * | 11/2000 | Ames et al. | 703/13 |
| 6,169,610 | B1 | * | 1/2001 | Wakasugi | 358/442 |

(Continued)

OTHER PUBLICATIONS

Lakshman et al., "TCP/IP Performance with Random Loss and Bidirectional Congestion," Oct. 2000, IEEE, p. 541-555.*

*Primary Examiner* — Qing Chen
(74) *Attorney, Agent, or Firm* — Sterne, Kessler, Goldstein & Fox PL.L.C.

(57) ABSTRACT

A system and method for analyzing the real-time performance of a communication device. An aspect of the present invention records information input to the communication device during real-time operation of the communication device. A playback device or module may execute a model of the communication device in a non-real-time environment according to the recorded real-time input information. System execution in the non-real-time playback environment may, therefore, be equivalent to the original operation of the communication device that occurred in real-time. Accordingly, situations that occur in real-time may be efficiently recreated in non-real-time playback. An operator may analyze the past real-time performance of the communication device using the playback device or module, the recorded real-time input information, and a debugger utility if desired, without conducting additional trials to reproduce the desired operational situation.

30 Claims, 3 Drawing Sheets

(56) References Cited

U.S. PATENT DOCUMENTS

| | | | |
|---|---|---|---|
| 6,189,084 B1 * | 2/2001 | Kurisu | 712/11 |
| 6,243,838 B1 * | 6/2001 | Liu et al. | 714/57 |
| 6,311,291 B1 * | 10/2001 | Barrett, Sr. | 714/25 |
| 6,370,230 B1 * | 4/2002 | Sellman | 379/22.04 |
| 6,467,052 B1 * | 10/2002 | Kaler et al. | 714/39 |
| 6,557,167 B1 * | 4/2003 | Thelen | 717/127 |
| 6,614,799 B1 * | 9/2003 | Gummalla et al. | 370/448 |
| 6,715,139 B1 * | 3/2004 | Kodosky et al. | 717/125 |
| 6,721,404 B1 * | 4/2004 | Lashley et al. | 379/102.02 |
| 6,772,411 B2 * | 8/2004 | Hayes et al. | 717/127 |
| 6,823,004 B1 * | 11/2004 | Abdelilah et al. | 375/222 |
| 6,865,731 B2 * | 3/2005 | Davia et al. | 717/127 |
| 6,965,638 B2 * | 11/2005 | Warke | 375/222 |
| 6,985,940 B1 * | 1/2006 | Jenkin | 709/224 |
| 7,043,719 B2 * | 5/2006 | Gotwals et al. | 717/131 |
| 7,246,368 B1 * | 7/2007 | Millet et al. | 725/111 |
| 2002/0136165 A1 * | 9/2002 | Ady et al. | 370/241 |
| 2003/0093720 A1 * | 5/2003 | Miyao et al. | 714/38 |
| 2004/0205406 A1 * | 10/2004 | Kaliappan et al. | 714/31 |
| 2004/0243349 A1 * | 12/2004 | Greifeneder et al. | 702/183 |

* cited by examiner

OPERATIONAL ANALYSIS SYSTEM FOR A COMMUNICATION DEVICE

CROSS-REFERENCE TO RELATED APPLICATIONS/INCORPORATION BY REFERENCE

This patent application claims the benefit of U.S. Provisional Application No. 60/480,666, filed Jun. 23, 2003, the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

FIELD OF THE INVENTION

The present invention relates generally to operational analysis of real-time communication systems. The present invention relates more specifically to operational analysis of communication devices.

BACKGROUND OF THE INVENTION

Real-time systems are often difficult to analyze. Such is the case for both hardware and software based systems. In hardware based systems, for example, an analyst may not be able to access a desired signal, much less, access the desired signal and causes of such signal in real-time. In fact, in some systems, even the mere act of accessing an available signal may have detrimental effects on the system operation.

In software based systems, for example, standard analysis techniques such as setting breakpoints in a debugging environment and stepping through a software program do not typically work well for real-time systems. For example, once the software program execution is stopped in the debugger, the relationship between the program's execution and the real-time chain of events is broken. Events continue to occur in real-time while the program is executed at a completely different non-real-time rate under the control of the debugger. Such single stepping through a program may not reveal the performance information sought since, by the time the section of software code of interest is executed, the conditions causing the event of interest have passed.

Also in software-based systems, for example, engineers have traditionally relied on debug messages in the program that normally include text strings and indicate which events are taking place, which piece of code is executing, and the values of certain parameters. However, such a technique does not provide a complete performance analysis solution since such messages cannot describe everything happening in the system. Using this traditional technique, debug messages would likely have to be incorporated into every part of the program where execution flow changes (e.g., in every "if" and "while" statement). The amount of debug messages may be excessive in such a case, and in fact, the execution of such debug messages may interfere with real-time system timing.

Further, when input data to a real-time system (e.g., a communication system) changes from one operation to the next, operational analysis becomes increasingly difficult. An analyst may need to perform a multitude of test trials before a problem can be reproduced, analyzed, understood and fixed. Another complication that may occur (e.g., in communication systems) is when the problem occurs only at a remote site due to the variance of the operational conditions. A trip to the remote site by one or more engineers may be required and can be time consuming and expensive.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method are provided for analyzing the performance of a real-time communication device (e.g., an Asymmetric Digital Subscriber Line (ADSL) modem). An aspect of the present invention fully records real-time information (e.g., samples, data and commands) that is input to a real-time communication device over a period of time. A playback device or module executes a model of the real-time communication device in a non-real-time environment according to the recorded information. System execution in the non-real-time playback environment is, therefore, equivalent to the original execution of the real-time communication device that occurred in real-time. Accordingly, any problems that occurred in real-time may be repeated in non-real-time playback. An operator may, for example, analyze the past real-time performance of the real-time communication device using the playback device or module, the recorded information, and a debugger utility if desired, without conducting additional trials to reproduce the operational situation of interest.

These and other advantages, aspects and novel features of the present invention, as well as details of illustrative aspects thereof, will be more fully understood from the following description and drawings.

DETAILED DESCRIPTION OF THE INVENTION

Figure 1:
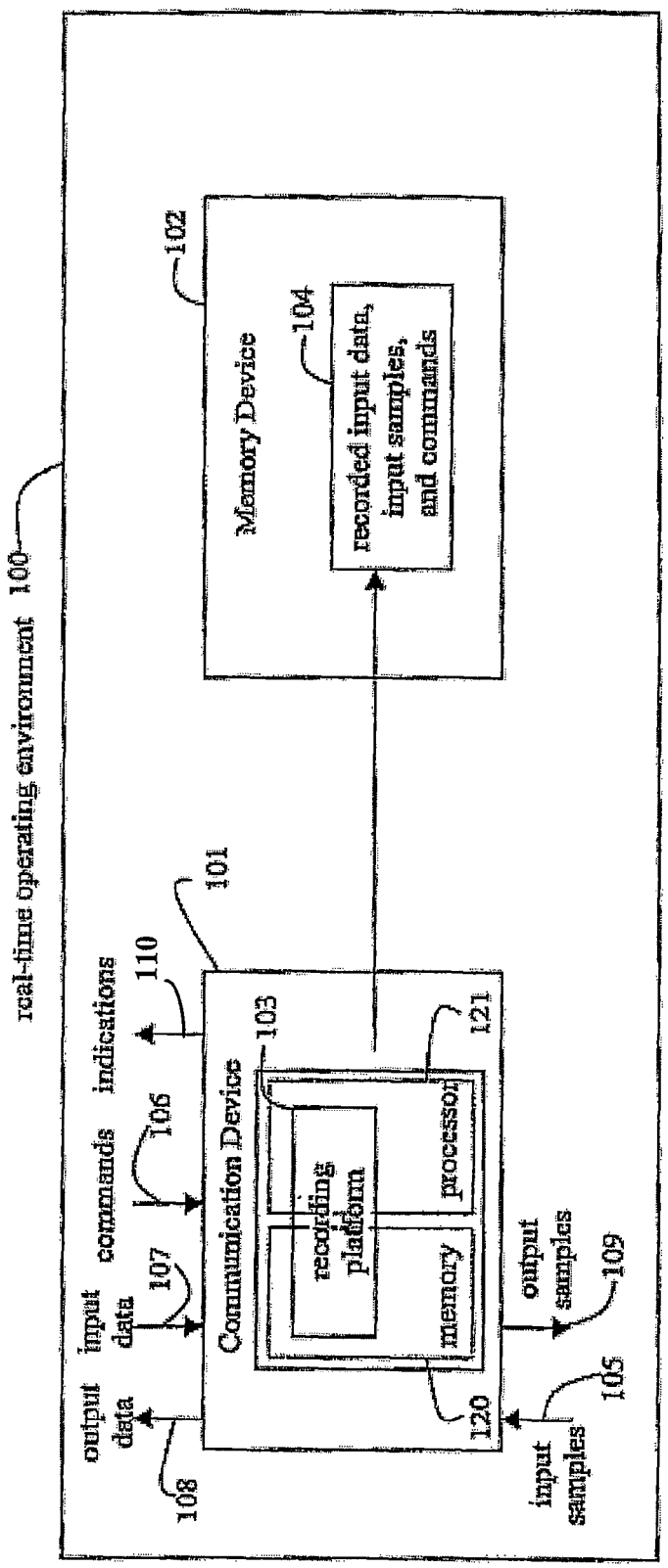
FIG. 1 is a diagram illustrating a real-time operating environment supporting operational analysis of a real-time communication device via recording of input information, in accordance with various aspects of the present invention.

FIG. 1 is a diagram illustrating aspects of a real-time operating environment 100 supporting operational analysis of a real-time communication device 101 via recording of input information, such as data, input samples, and commands, in accordance with various aspects of the present invention. The real-time communication device 101 may, for example, be a real-time high-speed communication device, like an ADSL modem or cable modem. The exemplary real-time operating environment 100 includes a real-time communication device 101 and a memory device 102, such as a hard disk, for example. The real-time communication device 101 includes a recording platform 103 for causing the recording of input data 107, input samples 105, and commands 106 to the memory device 102 as recorded input data, input samples and commands 104. The real-time communication device 101 is coupled to the memory device 102.

As mentioned previously, the real-time communication device 101 may be, for example, an ADSL modem. ADSL (Asymmetric Digital Subscriber Line) is a technology used to deliver broadband service using existing copper telephone lines. ADSL supports data rates from approximately 384 Kbps to 25 Mbps, and rising, when receiving data (i.e., the downstream rate), and from approximately 32 Kbps to 3 Mbps, and rising, when sending data (i.e., the upstream rate). The different downstream and upstream rates define the asymmetry.

A special communication device known as an ADSL modem is used to provide ADSL communication. In general, a modem (modulator/demodulator) is a communication device or program that enables a personal computer (PC) to transmit data over, for example, cable or telephone lines. PC information is stored and utilized in a digital form whereas information that is transmitted over telephone lines is transmitted in the form of analog signals. A modem converts between the digital and analog information forms. A modem may be internal or external to a PC. Two examples of high-speed modems are ADSL modems and cable modems. In general, as defined herein, "high-speed" refers to any communication device operating above 56 Kbps.

FIG. 1 illustrates the communication device 101 in a configuration and environment similar to an ADSL modem configuration and environment. However, the communication device 101 aspect of the present invention disclosed herein is by no means limited to an ADSL modem, nor is the communication media limited to telephone line communication. For example, the communication device 101 may be a cable modem, optical modem, radio frequency modem, or other known communication or interface device. The communications media may be, for example, telephone wire, television cable, optical cable, radio interface, or other known media.

Referring to FIG. 1, the communication device 101 converts the input samples 105 from the telephone line side of the communication device 101 to output data 108 on the PC side of the communication device 101. Conversely, the communication device 101 converts the input data 107 from the PC side of the communication device 101 to the output samples 109 on the telephone line side of the communication device 101. The commands 106 arrive at the communication device 101 from the PC side and control the mode of operation of the communication device 101. For example, one command may be "make a connection," and another command may be "send data." The communication device 101 may also output various indications 110 to the PC side. The input samples 105 may arrive at the communication device 101 in analog form and be converted to digital form by the communication device 101. The input data 107 and the commands 106 may arrive at the communication device 101 in digital form. Note that though the exemplary communication device 101 is a computer communication device, such as an ADSL modem, the scope of various aspects of the present invention should by no means be limited to characteristics of computer communication devices.

The recording platform 103 may reside on or with the communication device 101. For example, the communication device 101 may include a memory 120, processor 121 and recording platform 103. The recording platform 103 may include hardware, software, or a combination thereof. For example, a processor 121 on the communication device 101 may execute recording platform 103 instructions to cause the digitized input samples 105, input data 107 and commands 106 to be stored as recorded input samples, input data, and commands 104. Alternatively, for example, the recording platform may be a self-contained circuit or a stand-alone device that is communicatively coupled to other components of the communication device 101. Alternatively, for example, the recording platform may be integrated onto a communication device integrated circuit or multi-chip module. Accordingly, the scope of various aspects of the present invention should not be limited to particular characteristics and configurations of the recording platform 103.

The recording platform 103 may, for example, cause the information to be stored in exactly the same sequence as the information arrives as the communication device 101. The recording platform 103 may, for example, cause the information to be stored on a memory device 102 of a computer that is communicationally coupled to the communication device 101. Such a computer may, for example, be a computer directly connected to the communication device 101, or may be a computer coupled to the communication device 101 through a computer network.

Figure 2:
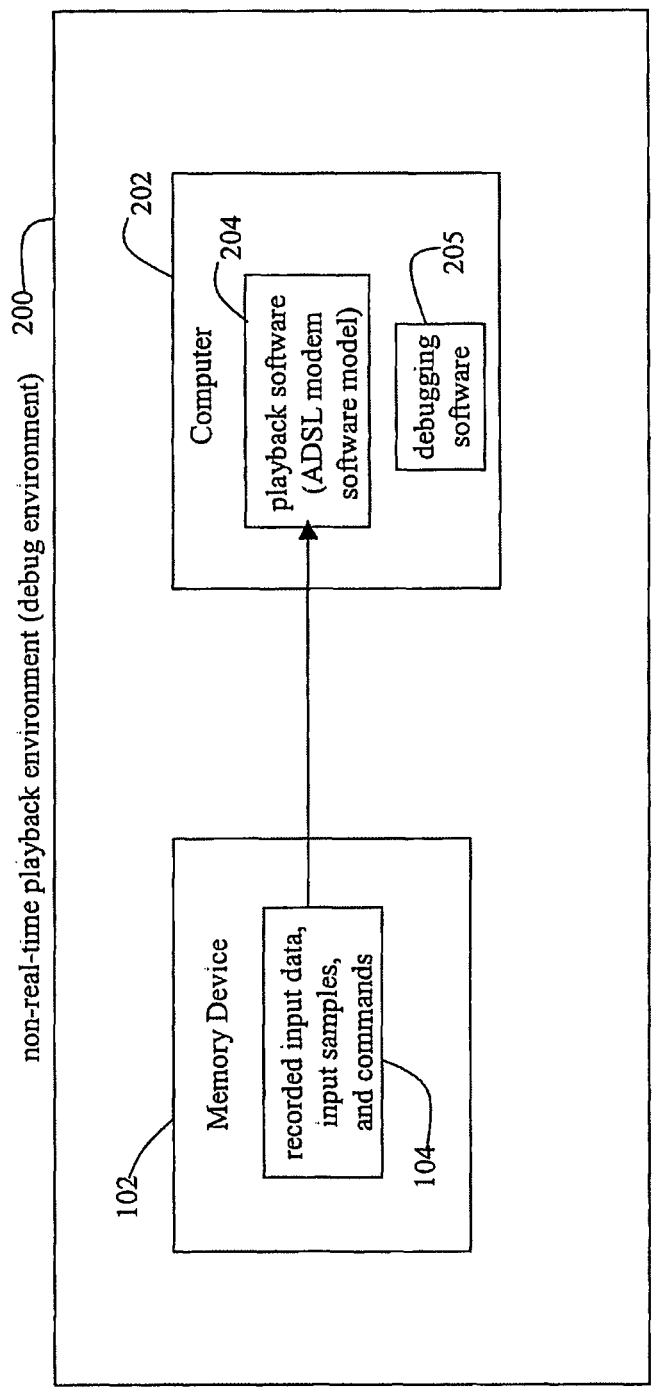
FIG. 2 is a diagram illustrating a non-real-time playback environment for supporting operational analysis of the operation of the real-time communication device of FIG. 1, for example, in accordance with various aspects of the present invention.

FIG. 2 is a diagram illustrating a non-real-time playback environment 200 for analyzing the operation of the real-time communication device 101 (e.g., an ADSL modem) of FIG. 1, for example, in accordance with various aspects of the present invention. Referring to FIG. 2, the non-real-time playback environment 200, which may also be referred to as a debug environment, includes a memory device 102 and a computer 202 running debugging software 205, which may also be referred to as a "debugging tool."

The memory device 102 may, for example, be the same memory device 102 discussed previously with regard to FIG. 1. For example, the memory device 102 may be a hard disk of a computer that is communicatively coupled to the communication device 101, or the hard disk of a computer that was communicatively coupled to the communication device 101 at some point during real-time operation of the communication device 101. The memory device 102 may include recorded information, such as, for example, input data, input samples and commands 104 that were recorded in the real-time operating environment 101 discussed previously. The memory device 102 may alternatively contain any input/output information of interest.

The computer 202 may, for example, be a personal computer (PC) or a network workstation. Such a computer 202 typically has a memory device containing software instructions and a processor for executing the software instructions. The computer 202 includes playback software 204, which includes a model of the communication device 101. For example, as illustrated in FIG. 2, the playback software 204 may include a bit-exact software model of the communication device 101 (e.g., an ADSL modem). In accordance with an aspect of the present invention, the playback software 204 may, for example, run as an application on a PC or workstation under a WINDOWS or LINUX operating system. The playback software 204 may, for example, reside on a hard disk of the computer 202 or a compact disc or DVD.

Alternatively, the computer 202 may be any playback device (or hardware or software module) that may operate according to the input information stored in the memory device 102. For example and without limitation, such a playback device may include hardware or software modeling components. Such a playback device may, for example, include various components of the actual communication device being modeled. Accordingly, the scope of various aspects of the present invention should by no means be limited to a particular configuration of playback device (or module or platform).

The computer 202 is coupled to the memory device 102. The memory device 102 may be external or internal to the computer 202. The coupling between the computer 202 and the memory device 102 may be as simple as a dedicated cable or as complex as the Internet. The memory device 102 may be a hard drive in the computer 202 on which also resides the playback software 204 and debugging software 205.

In accordance with an aspect of the present invention, an operator executes the playback software 204 on the computer 202. The playback software 204, when executed, causes the reading of the recorded input information from the memory device 102. The playback software 204 then operates the communication device model according to the recorded input data, input samples and commands 104. The operator may also execute debugging software 205, which allows the operator to control and observe the operation of the communication device model as the communication device model operates in accordance with the recorded input information.

In accordance with an aspect of the present invention, the recorded input information 104 are the exact data, samples, and commands recorded in the real-time operating environment 100 over a period of time. Also, the playback software 204 may be a bit-exact model of the operation of the communication device 101 (e.g., an ADSL modem). Therefore, any communication device 101 behaviors that occurred in the real-time operating environment 100 during the period of time over which the input data 107, input samples 105, and commands 106 were recorded will recur during analysis in the non-real-time playback environment 200.

Figure 3:
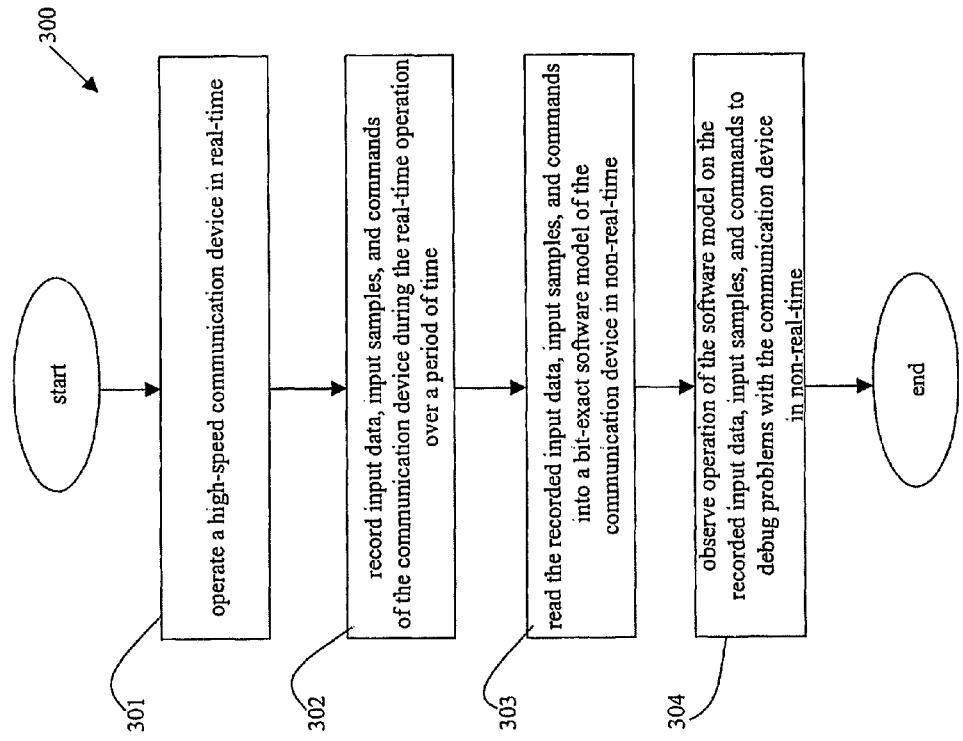
FIG. 3 is a flowchart illustrating a method for analyzing the operation of the real-time communication device of FIG. 1, for example, using the playback environment of FIG. 2, for example, in accordance with various aspects of the present invention.

FIG. 3 is a flowchart of a method 300 for analyzing the operation of the real-time communication device 101 of FIG. 1, for example, using the playback environment 200 of FIG. 2, for example, in accordance with various aspects of the present invention. In step 301, a communication device (such as an ADSL modem) is operated in real-time.

In step 302, while the communication device is operating in real-time, information input to (and perhaps output from) the communication device is recorded. Such real-time information may include the input data, input samples, and commands discussed previously. Alternatively such real-time information may include many other types of real-time information associated with the communication device.

The communication device may gather the real-time information internally. The communication device may direct the recording of the real-time information in a memory device external to the communication device. For example, the communication device may cause the real-time information to be written to the hard drive of a computer connected to the communication device. The communication device may optionally be driven as a WINDOWS operating system device driver in a computer and write the real-time information directly to the hard drive of the computer. The communication device may also cause the real-time information to be sent to a computer coupled to the communication device through a computer network, such as a local area network or the Internet.

In step 303, the recorded input information, such as, for example the real-time recorded input data, input samples, and commands are read into a model of the communication device in non-real-time. This step may be accomplished, for example, by the execution of computer instructions in playback software on a computer. Such playback software may, for example, when executed by a processor, cause the reading of the recorded real-time information into a software model of the communication device (e.g., into a software model of an ADSL modem). The software model may, for example, be a bit-exact model, producing results that are the same as the original device that the software model is modeling. The playback software may drive, or execute, the model of the communication device in non-real-time in accordance with the recorded real-time information. Consequently, the model of the communication device may mimic, perhaps exactly, the real-time operation of the communication device.

In step 304, the operation of the software model on the recorded input data and commands is observed in order to analyze, in non-real-time, the real-time performance of the communication device. For example, an operator may, through the utilization of aspects of the invention, debug the operation of a faulty communication device. An operator may, through the use of a software debugger tool, execute the playback instructions, and observe and control the operation of the communication device model in response to the recorded real-time information. The operator may thus recreate and observe a real-time operational situation of interest, in order to ascertain the real-time response of the actual communication device in response to the real-time stimuli received by the device.

As an example, refer to FIG. 1 and an ADSL modem example. In the real-time operating environment 100, the communication device 101 (e.g., an ADSL modem) may operate over a period of time on the input data 107, input samples 105, and commands 106. During real-time operation, the recording software platform 103 within the communication device 101 causes the recording of the input data 107, input samples 105, and commands 106, perhaps writing this information directly to the memory device 102 (e.g., a hard disk). In such a scenario, the communication device 101 may be a PCI card that is plugged into a PC, which in turn includes the memory device 102.

Referring then to FIG. 2, in the non-real-time playback environment 200, the computer 202 (e.g., a PC), which may be the same computer that houses the memory device 102, reads the recorded input data, input samples, and commands 104 from the memory device 102. The computer 202 runs the playback software 204 that operates a model of the communication device 101 in accordance with the recorded input data, input samples, and commands 104 in non-real-time. This provides the opportunity for an operator to analyze the real-time operation of the communication device 101 in non-real-time.

In accordance with an aspect of the present invention, the memory device 102 (e.g., a hard disk) and the communication device 101 (e.g., an ADSL modem) may be integrated into the computer 202 (e.g., a PC). In accordance with an alternative aspect of the present invention, the communication device 101 may be a standalone device that is connected to the phone lines on one end and to a computer 202 on the other end via, for example, an Ethernet connection. In such a configuration, the communication device 101 may forward the input data, input samples, and commands to the computer 202 over the Ethernet connection. The computer 202 then may include recording software instructions, which when executed, cause the capture and recordation of the input data, input samples, and commands to the memory device 102.

In summary, a system, apparatus and method are provided for analyzing the real-time operation of a communication device, such as an ADSL modem or a cable modem, in non-real-time.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A modem device comprising:
    a first input configured to receive information from a first device that is utilizing the modem device to communicate with a second device through a communication network;
    a second input configured to receive information from the second device through the communication network; and
    a recording processor, communicatively coupled to the first input and the second input, configured to fully record input information arriving at one or both of the first input and the second input during real-time operation of the modem device for subsequent non-real-time analysis, wherein the recording processor is further configured to cause the input information arriving at the first input and the second input during real-time operation of the modem device to be fully recorded in a same sequence as the input information is received at the modem device.

2. The modem device of claim 1, further comprising a command input configured to receive modem control commands from the first device, wherein the recording processor is further configured to cause the modem control commands arriving at the command input during real-time operation of the modem device to be fully recorded for subsequent non-real-time analysis.

3. The modem device of claim 1, wherein the first device is a personal computer, and wherein the recording processor is further configured to cause the input information arriving at the first input from the personal computer and arriving at the second input from the second device through the communication network, during real-time operation of the modem device, to be fully recorded on a memory device of the personal computer.

4. The modem device of claim 3, wherein the modem device operates to cause the input information to be fully recorded on the memory device of the personal computer by, at least in part, being driven as an operating system (OS) device driver of the personal computer to write the input information directly to a hard drive of the personal computer.

5. The modem device of claim 1, wherein the recording processor is further configured to cause the input information arriving at the first input from the first device and arriving at the second input from the second device through the communication network to be communicated to a networked computer communicatively coupled to the modem device over the communication network and fully recorded on a memory device of the networked computer.

6. The modem device of claim 1, wherein the modem device comprises an ADSL modem.

7. The modem device of claim 1, wherein the recording processor is integrated into an integrated circuit of the modem device.

8. A non-real-time playback environment for analyzing real-time performance of a modem, the non-real-time playback environment comprising:
    a memory storing input information recorded by a recording module residing on a modem, wherein the recording module fully records the input information received at the modem during real-time operation of the modem; and
    a playback module communicatively coupled to the memory, wherein the playback module comprises a model of the modem that the playback module executes according to the input information stored in the memory, and wherein the model of the modem is a hardware model that comprises an actual hardware component that is the same as a hardware component of the modem being modeled.

9. The non-real-time playback environment of claim 8, wherein the input information comprises:
    information from a computer coupled to the modem; and
    information from a device with which the computer was communicating through a communication network using the modem.

10. The non-real-time playback environment of claim 8, wherein the input information comprises data and modem control commands sent from a computer to the modem.

11. The non-real-time playback environment of claim 8, further comprising a debugging module communicatively coupled to the playback module that provides for controlling and observing operation of the playback module.

12. The non-real-time playback environment of claim 8, wherein the model of the modem comprises a bit-exact software model of the modem that, when executed, produces results that are the same as an original modem that the bit-exact software model is modeling.

13. The non-real-time playback environment of claim 8, further comprising a computer communicatively coupled to the modem, wherein the memory is a memory device of the computer.

14. The non-real-time playback environment of claim 13, wherein the computer comprises the playback module.

15. The non-real-time playback environment of claim 8, further comprising a networked computer communicatively coupled to the modem over a computer network, wherein the networked computer comprises the memory.

16. The non-real-time playback environment of claim 8, wherein the model of the modem comprises a bit-exact software model of the modem that exactly mimics the real-time operation of the modem.

17. The non-real-time playback environment of claim 8, wherein the playback module comprises playback software that, when executed by a processor, causes reading of the input information into the model of the modem.

18. The non-real-time playback environment of claim 8, wherein the model of the modem comprises a software component that is the same as a software component of the modem being modeled.

19. The non-real-time playback environment of claim 8, wherein the playback module comprises playback software comprising a bit-exact model of the real-time operation of the modem, such that any modem behaviors that occurred in real-time operation during a period of time over which the input information was obtained will recur during execution of the playback software in the non-real-time playback environment.

20. A method for analyzing real-time operation of a modem, the modem comprising a first input that receives information from a first device that is utilizing the modem to communicate with a second device through a communication network and a second input that receives information from the second device through the communication network, the method comprising:
    operating the modem in real-time to communicatively couple the first device and the second device, wherein the modem comprises a recording module;
    while operating the modem in real-time, utilizing the recording module of the modem to fully record input information input to at least the first and/or second inputs of the modem; and
    after operating the modem in real-time, executing a model of the modem, wherein the model of the modem is responsive to the fully-recorded input information, and wherein:
        the model of the modem comprises a hardware component that is the same as a hardware component of the modem; and
        executing the model of the modem comprises utilizing the hardware component.

21. The method of claim 20, wherein:
the first device comprises a personal computer; and
utilizing the recording module of the modem comprises utilizing the recording module of the modem to fully record the input information input to at least the first and/or second inputs of the modem to a memory device of the personal computer.

22. The method of claim 21, wherein operating the modem in real-time comprises driving the modem as an operating system (OS) device driver on the personal computer.

23. The method of claim 20, wherein:
the second device is a computer; and
utilizing the recording module of the modem comprises utilizing the recording module of the modem to fully record the input information input to at least the first and/or second inputs of the modem to a memory device of the computer.

24. The method of claim 23, wherein utilizing the recording module of the modem comprises executing a recording application program on the computer.

25. The method of claim 20, wherein:
the first device is a personal computer; and
utilizing the recording module of the modem to fully record the input information input to at least the first and/or second inputs of the modem comprises utilizing the recording module of the modem to fully record the input information comprising:
    data input to the first input from the personal computer;
    commands input to a command input of the modem from the personal computer; and
    samples input to the second input from the second device through the communication network.

26. The method of claim 20, wherein executing the model of the modem comprises executing a software model of the modem, and the method further comprises reading the fully-recorded input information into the software model of the modem.

27. The method of claim 20, wherein executing the model of the modem comprises executing a bit-exact software model of the modem.

28. The method of claim 20, wherein:
the model of the modem comprises a software component that is the same as a software component of the modem; and
executing the model of the modem comprises executing the software component.

29. The method of claim 20, further comprising debugging operation of the modem by, at least in part, observing execution of the model of the modem with the fully-recorded input information in non-real-time.

30. The method of claim 20, wherein the modem comprises an ADSL modem.

* * * * *